US012597363B2

(12) United States Patent
Eriksen et al.

(10) Patent No.: US 12,597,363 B2
(45) Date of Patent: *Apr. 7, 2026

(54) STEERING WHEEL CONNECTOR FOR AUTOMOTIVE SIMULATOR

(71) Applicant: ASETEK DANMARK A/S, Aalborg East (DK)

(72) Inventors: André Sloth Eriksen, Nibe (DK); Per Michael Kromann, Aalborg East (DK)

(73) Assignee: Asetek Danmark A/S, Aalborg East (DK)

( * ) Notice: Subject to any disclaimer, the term of this patent is extended or adjusted under 35 U.S.C. 154(b) by 110 days.

This patent is subject to a terminal disclaimer.

(21) Appl. No.: 18/298,001

(22) Filed: Apr. 10, 2023

(65) Prior Publication Data

US 2023/0260419 A1      Aug. 17, 2023

Related U.S. Application Data

(63) Continuation of application No. 17/969,334, filed on Oct. 19, 2022, now Pat. No. 12,462,706.

(Continued)

(30) Foreign Application Priority Data

Aug. 4, 2022     (WO) ................. PCT/EP2022/071925

(51) Int. Cl.
    *G09B 9/042*          (2006.01)
(52) U.S. Cl.
    CPC ..................................... *G09B 9/042* (2013.01)
(58) Field of Classification Search
    CPC ................................................. H01R 2201/26
    See application file for complete search history.

(56) References Cited

U.S. PATENT DOCUMENTS

| | | | | |
|---|---|---|---|---|
| 8,132,828 B2* | 3/2012 | Wright | ..................... | B62D 1/16 |
| | | | | 280/771 |
| 2001/0046897 A1* | 11/2001 | Hagiwara | ............. | A63F 13/245 |
| | | | | 463/37 |

(Continued)

FOREIGN PATENT DOCUMENTS

DE          202019105567 U1 *  10/2019   ............... B62D 1/10

OTHER PUBLICATIONS

International Search Report and Written Opinion dated Nov. 24, 2022, for International Application No. PCT/EP2022/071925, filed Aug. 4, 2022 (11 Pages).

(Continued)

*Primary Examiner* — Dmitry Suhol
*Assistant Examiner* — Alyssa N Brandley
(74) *Attorney, Agent, or Firm* — Finnegan, Henderson, Farabow, Garrett & Dunner LLP

(57)                ABSTRACT

A steering wheel adapter system for an automotive simulator includes a first adapter element formed in a distal end of the steering wheel and a second adapter element formed in a proximal end of a steering axle of the automotive simulator. The first adapter element comprises a first electrical contact surface and the second adapter element comprises a second electrical contact surface. The first and second adapter elements are configured to slide against each other along a plane that is substantially perpendicular to the steering axle, until a coupling position has been reached wherein a central axis of the steering wheel is aligned with a central axis of the steering axle, and the first and second electrical contact surfaces make contact with each other to establish an electrical connection. A steering wheel having a first adapter element and a steering axle having a second adapter element are also described.

15 Claims, 7 Drawing Sheets

Related U.S. Application Data

(60) Provisional application No. 63/263,681, filed on Nov. 7, 2021.

(56) References Cited

U.S. PATENT DOCUMENTS

| | | | |
|---|---|---|---|
| 2011/0291392 A1* | 12/2011 | Karlsson | H01R 13/631 |
| | | | 280/728.2 |
| 2015/0217795 A1* | 8/2015 | Barnes | F16D 1/06 |
| | | | 403/334 |

OTHER PUBLICATIONS

Sim Racing Garage, "Simucube SC2 Pro DD Wheelbase Review", Jun. 15, 2019, https://www.youtube.com/watch?v=BxDw61RWMs0.

* cited by examiner

200

204

202

206   210

208

206

208

202

210

STEERING WHEEL CONNECTOR FOR AUTOMOTIVE SIMULATOR

This application is a continuation of U.S. patent application Ser. No. 17/969,334, filed Oct. 19, 2022, which claims priority to U.S. Provisional Application No. 63/263,681 filed on Nov. 7, 2021, and International Application No. PCT/EP2022/071925, filed Aug. 4, 2022, each of which is incorporated herein by reference in its entirety.

FIELD OF THE INVENTION

Systems and devices consistent with the present disclosure generally relate to a steering wheel connector. More particularly, systems and devices consistent with the disclosure relate to a steering wheel connector for use in automotive simulators that provides a combined mechanical and electrical connection between a removable steering wheel and the automotive simulator.

BACKGROUND

Automotive simulation systems that simulate the experience of driving a car are used for both video gaming purposes as well as for training purposes for persons involved in driving, such as racing car drivers. To effectively achieve these video gaming and training purposes, the simulation provided by these automotive simulation systems must be able to replicate the experience of a real car with a high degree of accuracy and authenticity. However, designing an automotive simulation system that achieves a high degree of accuracy and authenticity is difficult and expensive to produce.

In order to make the simulation as realistic as possible (i.e., with a high degree of accuracy and authenticity), it is important that, in addition to the visual experience, user interface equipment, such as steering wheels and brake systems, is equal to that which is experienced in a real car. This allows for maximum learning potential in automotive simulation systems used for training, and maximum entertainment emersion potential in automotive simulation systems used for video gaming purposes. Regarding the steering wheel in automotive simulation systems, it is important that the mechanical elements, such as various buttons and controls on the steering wheel, correspond to those of a real car. Thus, it is important to be able to exchange steering wheels in an automotive simulator such that they match the steering wheels of the real car. Further, some cars, especially sport cars, may require the steering wheel to be temporarily removed in order for the driver to easily enter or exit the automotive simulator.

In conventional automotive simulators that allow for removal of the steering wheel, typically a mechanical connector is used to connect the steering wheel to the steering axle, and a separate, electrical connector is used to create an electrical connection between the controls on the steering wheel and the automotive simulator. This makes installation and removal of the steering wheel cumbersome as it involves disconnecting the electrical cords and the steering wheel as separate operations. Furthermore, the aesthetic appearance with electrical cords dangling on the side of the steering wheel is also less than ideal, and also creates a risk of the driver of the automotive simulator getting entangled in the electrical cords, which may adversely affect the driver's experience in the automotive simulator. In view of the foregoing, it is desirable to create a steering wheel connection that avoids or at least reduces these and other associated problems.

SUMMARY

According to a first aspect of the present disclosure, a steering wheel adapter system for an automotive simulator is provided. The steering wheel adapter system includes a first adapter configured to connect to a distal end of the steering wheel. The first adapter element comprises at least one of a first electrical contact surface and a first optical contact surface. The steering wheel adapter system further includes a second adapter element configured to connected to a proximal end of a steering axle of the automotive simulator. The second adapter element comprises at least one of a second electrical contact surface and a second optical contact surface. The first adapter element and the second adapter element are configured to slide against each other along a plane that is substantially perpendicular to the steering axle, until a coupling position is reached in which a central axis of steering wheel is aligned with a central axis of the steering axle. At least one of the first and second electrical contact surfaces and the first and second optical contact surfaces make contact with each other to establish an electrical connection, an optical connection, or both between the steering wheel and the steering axle of the automotive simulator.

In some embodiments, a steering wheel for an automotive simulator includes a distal end having a first adapter element comprising a first electrical contact surface. The first adapter element is configured to slide against a second adapter element formed in a proximal end of a steering axle of the automotive simulator and comprising a second electrical contact surface. The first and second adapter elements are positioned to slide along a plane that is substantially perpendicular to the steering axle until a coupling position has been reached in which a central axis of the steering wheel is aligned with a central axis of the steering axle, and the first and second electrical contact surfaces make contact with each other to establish an electrical connection between the steering wheel and the steering axle of the automotive simulator.

In some embodiments, a steering axle for an automotive simulator includes a proximal end having a second adapter element comprising a second electrical contact surface. The second adapter element is configured to slide against a first adapter element formed in a distal end of a steering wheel and comprising a first electrical contact surface. The second adapter element is configured to slide along a plane that is substantially perpendicular to the steering axle until a coupling position with the first adapter element of the steering wheel has been reached in which a central axis of the steering wheel is aligned with a central axis of the steering axle, and the first and second electrical contact surfaces make contact with each other to establish an electrical connection between the steering wheel and the steering axle of the automotive simulator.

In some embodiments, an automotive simulator including a steering wheel adapter system comprises a steering wheel, a steering axle, and a first adapter element configured to connect to in a distal end of the steering wheel, the first adapter element comprising at least one of a first contact surface. The automotive simulator including a steering wheel adapter system further comprises a second adapter element configured to connect to in a proximal end of the steering axle, the second adapter element comprising at least one of a second contact surface. The first adapter element and the second adapter element are configured to slide against each other along a plane that is substantially perpendicular to the steering axle until a coupling position is reached in which a central axis of steering wheel is aligned with a central axis of the steering axle. The first contact surface includes at least one of a first electrical contact surface, a first optical contact surface, and a first partial electrical-partial optical contact surface. The second contact surface includes at least one of a second electrical contact surface, a second optical contact surface, and a second partial electrical-partial optical contact surface. At least one of the first contact surface and at least one of the second contact surface make contact with each other to establish an electrical connection, an optical connection, or both between the steering wheel and the steering axle of the automotive simulator.

By placing electrical contact surfaces in the respective adapter parts, it is possible to achieve both a mechanical and electrical contact between the steering wheel and the steering axle of the automotive simulator in a single action, rather than first having to create a mechanical connection and then separately connecting an electrical cord, as is done in current solutions. Further, the sliding operation by which the two adapter elements connect to eventually make contact with each other in a coupling position, in which the electrical connection is established, also makes the installation and removal of the steering wheel a very intuitive and simple operation for a user of the automotive simulator, which can be easily accomplished as the user enters or leaves the seat of the automotive simulator. A clean appearance is also created, in which no loose cords are sitting next to the steering wheel and steering axle, which also reduces the risk of the driver getting entangled in such cords, either while driving or while entering/exiting the automotive simulator. Further, in many cases, the space around the driver of the automotive simulator is limited. Therefore, it is a much easier operation for the driver to connect/disconnect the steering wheel to the steering axle by sliding the steering wheel in a direction that is essentially perpendicular to the steering axle, compared to a motion where the steering wheel is slid along the steering axle (e.g., pulled towards or pushed away from the driver).

In one embodiment, the first adapter element is formed as a recess and the second adapter element is formed as a protrusion. In another embodiment, the first adapter element is formed as a protrusion and the second adapter element is formed as a recess. The geometric shape of these protrusions and recesses may vary in different embodiments, but as a general rule, they are configured to match one another such that one can be slid into the other and end up in a distinct, coupling position, where it is evident to the user that the steering wheel is firmly coupled on the steering axle and that electrical contact between the steering wheel and steering axle has been established. By having the recess/protrusion in combination with a combination with the sliding movement to connect the two adapter elements, it is also possible to reduce the risk of the steering wheel detaching from the steering axle if a driver were to pull the steering wheel towards himself. Thus, a more secure connection is created compared to if the steering wheel were installed by simply pushing it onto the end of the steering axle.

In one embodiment, gravity acts as a contributing force in the coupling position to push the first and second adapter elements together and retain them in the coupling position. That is, the steering wheel is attached to the steering axle in a downward sliding motion, and the electrical contact surfaces are placed along the bottom of the adapter elements (i.e., the portion of the adapter element that is located closest to the ground). Thereby the weight of the steering wheel contributes not only to keeping the wheel in the coupling position, but also to actively pushing the two electrical contact surfaces against each other to maintain electrical contact between the steering wheel and the steering axle. In some embodiments, which will be described in further detail below, a locking pin can also be inserted into aligned holes that run through the first and second adapter elements to prevent the first and second adapter elements from separating from one another after the steering wheel has been attached to the steering axle.

In one embodiment, the first electrical contact surface is connected to one or more user controls on the steering wheel, and the second electrical contact surface is connected to the automotive simulator through wiring running inside the steering axle to a computer that hosts the software needed for operating the automotive simulator. This makes it possible to transfer user control commands from the steering wheel to the automotive simulator through the steering axle.

In one embodiment, the first electrical contact includes one or more plain metal surfaces, and the second electrical contact includes one or more spring-loaded pogo pin connectors. These types of contacts are well known in the art, thus making it possible to use the steering wheel adapter system with conventional electronics setups, which facilitates compatibility with existing automotive simulators. Having spring-loaded pogo pin connectors also allows some degree of flexibility and ensures that electrical contact is made even in a situation where the user makes a minor mistake when mounting the steering wheel onto the steering axle. Of course, there can also be other embodiments in which the first contact includes spring-loaded pogo pin connectors, and the second contact includes one or more plane metal surfaces.

In one embodiment, the dimensions of the first electrical contact surfaces are bigger than the dimensions of the contact surfaces of the pogo pins to ensure contact and depend on the spacing of the pogo pins on the second electrical contact surface. The area of the contact surface of each pogo pin could, in one embodiment, be $0.5 \times 0.5$ mm$^2$.

According to a second aspect, the disclosure pertains to a steering wheel for an automotive simulator. The steering wheel has a distal end with a first adapter element comprising a first electrical contact surface, wherein the first adapter element is configured to slide against a second adapter element formed in a proximal end of a steering axle of the automotive simulator and comprising a second electrical contact surface, wherein the sliding occurs along a plane that is substantially perpendicular to the steering axle until a coupling position has been reached in which a central axis of the steering wheel is aligned with a central axis of the steering axle, and the first and second electrical contact surfaces make contact with each other to establish an electrical connection between the steering wheel and the steering axle of the automotive simulator.

According to a third aspect, the disclosure pertains to a steering axle for an automotive simulator. The steering axle has a proximal end with a second adapter element comprising a second electrical contact surface, wherein the second adapter element is configured to slide against a first adapter element formed in a distal end of a steering wheel and comprising a first electrical contact surface, wherein the sliding occurs along a plane that is substantially perpendicular to the steering axle until a coupling position has been reached in which a central axis of the steering wheel is aligned with a central axis of the steering axle, and the first and second electrical contact surfaces make contact with each other to establish an electrical connection between the steering wheel and the steering axle of the automotive simulator.

The second and third aspects of the disclosure may be varied similar to what has been described above for the first aspect, and consequently comprises a similar set of advantages.

The details of one or more embodiments of the disclosure are set forth in the accompanying drawings and the description below. Other features and advantages of the invention will be apparent from the description and drawings, and from the claims.

BRIEF DESCRIPTION OF THE DRAWINGS

The accompanying drawings, which are incorporated in and constitute a part of this disclosure, illustrate various embodiments and aspects of the present disclosure. In the drawings.

Like reference symbols in the various drawings indicate like elements.

DETAILED DESCRIPTION

Figure 1:
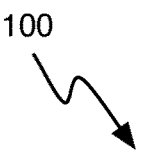
FIG. 1 illustrates a perspective view of a steering wheel 100 for use in an automotive simulation system in accordance with one embodiment.
Figure 1:
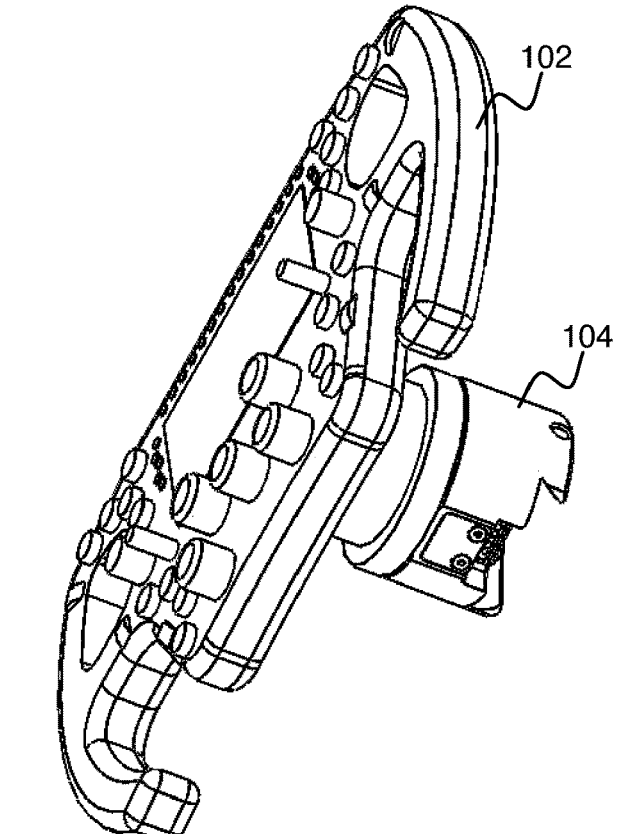

The following detailed description refers to the accompanying drawings. Wherever possible, the same reference numbers are used in the drawings and in the following description to refer to the same or similar parts. While several exemplary embodiments and features of the disclosure are described herein, modifications, adaptations, and other implementations are possible without departing from the spirit and scope of the disclosure. For example, substitutions, additions, or modifications may be made to the components illustrated in the drawings, and the exemplary methods described herein may be modified by substituting, reordering, or adding steps to the disclosed methods. Accordingly, the following detailed description does not limit the disclosure. Instead, the proper scope of the disclosure is defined by the appended claims.

Systems and devices consistent with the present disclosure generally relate to a steering wheel connector for use in an automotive simulator, which allows a mechanical and an electrical connection to be accomplished between the steering wheel and the automotive simulator in a single operation and without the use of separate cords.

FIG. 1 is a perspective view illustrating an embodiment of a steering wheel 100 for use in an automotive simulation system, such as a racing video game simulator or a professional racecar driver training simulator. As can be seen in FIG. 1, the steering wheel 100 has a steering handle 102, which faces the user when the steering wheel 100 is installed in the automotive simulation system. The steering handle 102 is where the user places their hands and has a number of controls for the operation of the automotive simulation system. The steering handle 102 of the steering wheel 100 is connected to a distal end 104. The distal end 104 of the steering wheel 100 connects to a steering axle in the automotive simulator, using the steering wheel adapter system, which will be described in further detail below, to secure the steering wheel 100 onto the steering axle. In order to perform that function, the distal end 104 of the steering wheel 100 comprises a first adapter element, which will now be described in further detail with respect to FIGS. 2 and 3.

Figure 2:
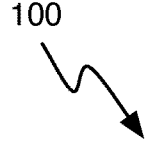
FIG. 2 illustrates a rear perspective view of the steering wheel 100 of FIG. 1, having a first adapter element, in accordance with one embodiment.
Figure 2:
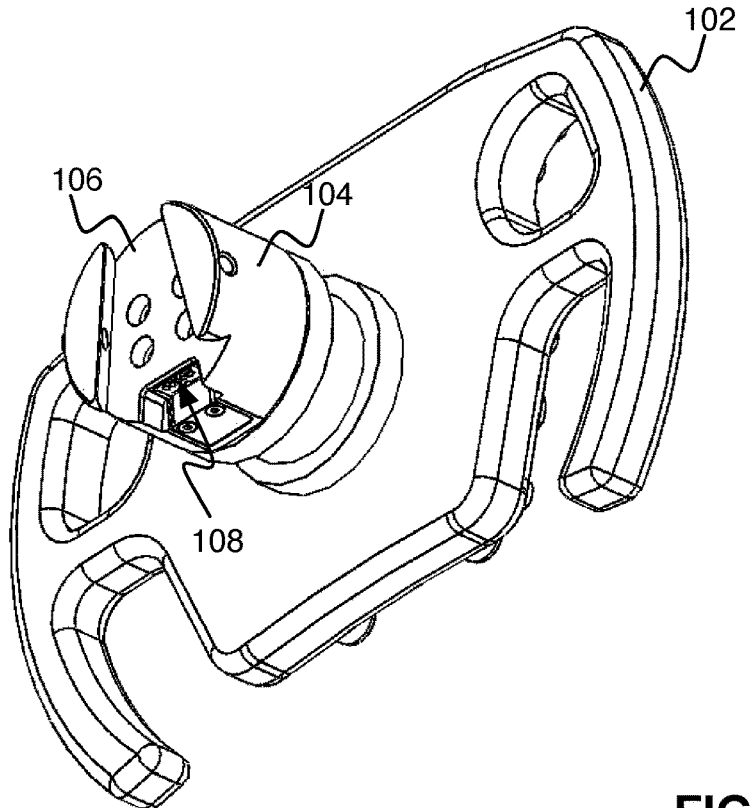

FIG. 2 is a rear perspective view illustrating the steering wheel 100. As can be seen in FIG. 2, the distal end 104 comprises a recess 106 and a first electrical contact surface 108, which together form the first adapter element. The recess 106 and first electrical contact surface 108 are configured to pair up with a corresponding protrusion and a second electrical contact surface on the proximal end of the steering axle, as will be described in further detail below. In the embodiment shown in FIG. 2, the recess 106 has a "trapezoid" shape, which allows the steering wheel 100 to distinctly slide on to the corresponding protrusion in the steering axle and come to a distinct stop when the steering wheel 100 is fully aligned with the steering axle in a coupling position. In that coupling position, the first electrical contact surface 108 also touches a corresponding second electrical contact surface in the second adapter part on the steering axle, thereby enabling electrical contact between the steering wheel 100 and the automotive simulator. One advantage with the trapezoid shape is that initially when the steering wheel 100 is being slid onto the steering axle, the width of the opening in the recess 106 is much bigger than the width of the corresponding protrusion in the steering axle, which makes it easy for the user to initially fit the two parts together. Then, as the steering wheel 100 is slid downwards, the trapezoid shape ensures that the first and second adapter elements are aligned, and that the electric contact surfaces on each element meet in a precise position, ensuring that the electrical contacts on the steering wheel 100 and the steering axle, respectively, are paired as intended. However, it should be noted that the trapezoid shape of the recess 106 is only one of many possible shapes that can ensure a distinct coupling position for the steering wheel 100, and that many other shapes that achieve the same purpose can be envisioned by those having ordinary skill in the art. As shown in FIG. 2, the plane of recess 106 is the sliding plane that is substantially perpendicular to the steering axle. In some embodiments, deviations ranging from 0 to 20 degrees are allowed for the perpendicularity between the sliding plane and the steering axle.

In the embodiment shown in FIG. 2, the first electrical contact surface 108 is located on the sidewall of a cutout area of the recess 106. The size and shape of the cutout (and thereby the size of the electrical contact surface 108) can vary to accommodate various types of contacts on the first electrical contact surface 108. In addition, by placing the first electrical contact surface 108 inside a cutout and closer to the center of the steering wheel 100, the electrical connection is more secure and protected from various types of environmental factors, such as dust or dirt or accidental liquid spills, etc. The distance between the electrical contact surface 108 and the controls on the steering wheel 100 also becomes shorter, which also makes it less prone to problems. Finally, the shape of the cutout itself serves to provide additional structural support when the steering wheel 100 is in the coupling position against a protrusion having a corresponding shape in the steering axle, compared to what can be accomplished by the recess 106 by itself. The first electrical contact surface 108 can have a wide range of physical embodiments. In the embodiment shown in FIG. 2, the first electrical contact surface 108 is a flat metal surface, which comprises a number of electrical leads that are connected to the controls on the steering wheel 100. However, many other variations of electrical contact surfaces can be envisioned by those having ordinary skill in the art.

Figure 3:
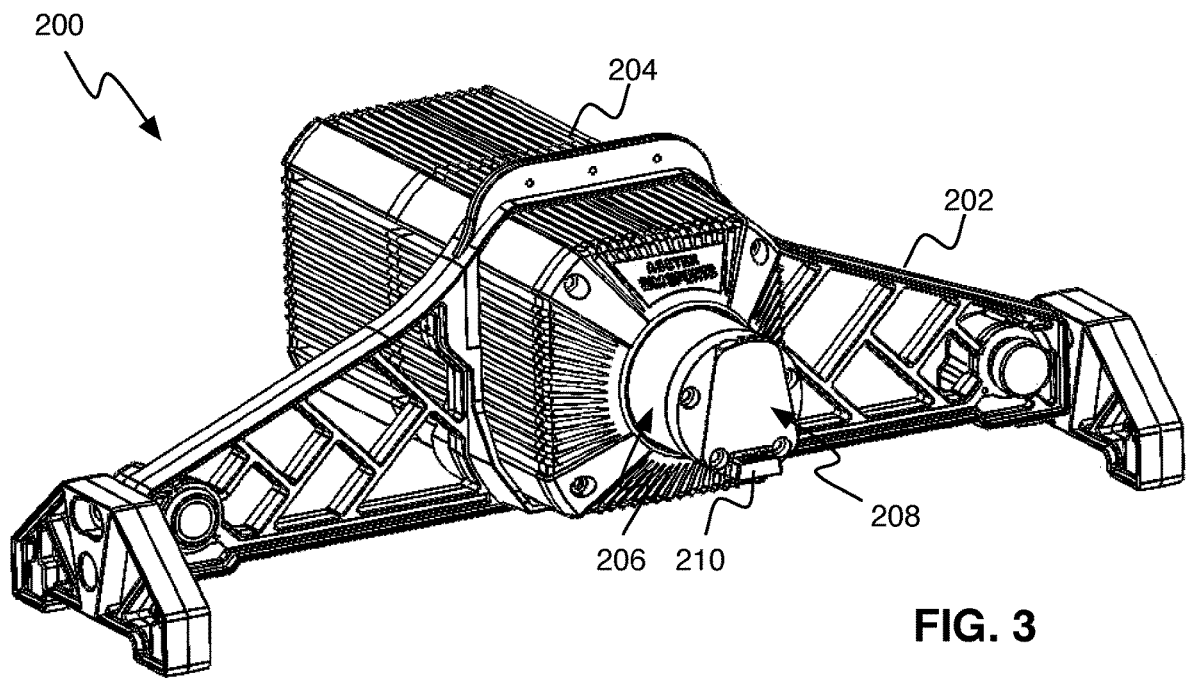
FIG. 3 illustrates a perspective view of a steering wheel base 200 for use in an automotive simulation system, in accordance with one embodiment.

FIG. 3 is a perspective view illustrating an embodiment of a steering wheel base 200 of an automotive simulator. As can be seen in FIG. 3, the steering wheel base 200 has a support frame 202, which attaches to a solid surface, such as a table or similar type of surface. The support frame holds an electrical motor 204, inside which a steering axle 206 is mounted. This embodiment is typically used in various types of home environments for users who like to have their personal automotive simulator. In commercial environments, such as gaming arcades or professional training environments, there is typically no support frame 202, but instead the motor 204 is mounted into a housing of the automotive simulator using different means. Again, the specific ways of mounting the motor 204 may vary depending on the particular circumstances at hand and lie well within the capabilities of those having ordinary skill in the art.

Figure 4:
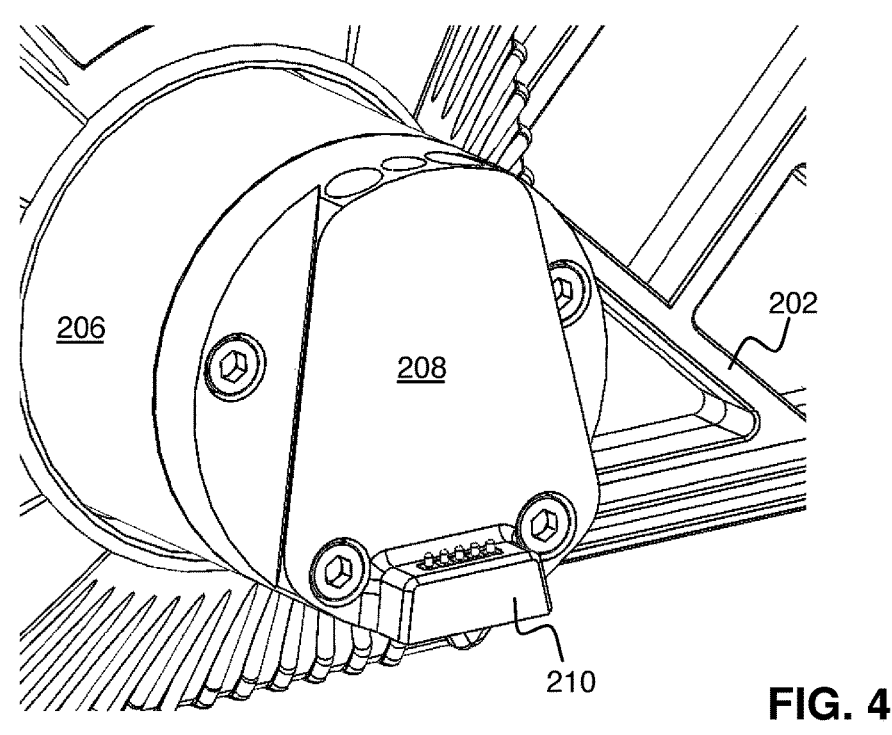
FIG. 4 illustrates a closeup view of a second adapter element, in accordance with one embodiment.

The proximal end of the steering axle 206 comprises a protrusion 208 and a second electrical contact surface 210, which together form a second adapter element that is designed to connect to the first adapter element of the steering wheel 100, described above. A magnified view of the steering axle 206, the protrusion 208 and the second electrical contact surface 210 is shown in FIG. 4. The various components of the second adapter element have features complementing those of the first adapter element described above, such that when the first and second adapter elements are joined together, there is a snug mechanical and electrical connection between the steering wheel 100 and the steering axle 206. In the embodiment shown in FIG. 4, the second electrical contact surface 210 comprises a number of spring-loaded pins, which are adapted to contact the flat metal surface of the first electrical contact surface 108. By using spring-loaded pins, it is possible to ensure an electrical connection, even in a situation where the user does not fully push the steering wheel 100 down onto the steering axle 206 during installation. However, again, it should be noted that this is merely one example of an electrical contact surface and that many alternatives can be envisioned by those having ordinary skill in the art. In the embodiment shown in FIGS. 3 and 4, the steering axle 206 is hollow and houses one or more cables that connect the electrical contacts on the second electrical contact surface 210 with the electronics in the automotive simulator. In the embodiment shown in FIGS. 1-4 the surface with the electrical contacts on each adapter element is pointing upwards and downwards relative the direction of movement when interconnecting the two adapter elements. As an alternative, the electrical contacts could also be positioned on the perpendicular surfaces of each of the adapter parts since these surfaces are also facing each other when the adapter parts are interconnected. In such a setup, the electrical connector elements could be replaced by an alternative type of electrical connectors optimized for connection on this perpendicular surface. In the embodiment described in connection with FIGS. 1-4 and in the alternative embodiment, a common feature is that electrical connection is obtained by sliding the two adapter elements together and when in position connection surfaces are opposing each other to enable electrical connection.

It should be noted that while the above discussion refers to electrical connections, this is not intended to include power only, but also various types of data that is communicated between the steering wheel 100 and the automotive simulator. For example, in some embodiments the steering wheel 100 comprises a number of control buttons and/or a display that may show information and/or warnings to the user. Any power and information that these elements use can be transferred through the electrical connections of the steering wheel adapter. Further it should be noted that the connections could also be either solely optical connections or a combination of electrical and optical connections in such situation it would be an optical or partly contact surface on the first and the second surface on the first and the second adapter element. Specifically, the first electrical surface 108 in FIG. 2 can at least partially be replaced with a first optical contact surface on the first adapter element. The second electrical surface 210 in FIG. 3 can at least partially be replaced with a second optical contact surface on the second adapter element. The connection is configured to be one of the following connections: an electrical connection between a first electrical contact surface and a second electrical contact surface; an optical connection between a first optical contact surface and a second optical contact surface, and an electrical and optical connection between a first partial electrical partial optical contact surface and a second partial electrical partial optical contact surface.

In some embodiments, the first adapter element comprises at least one of a first contact surface and the second adapter element comprises at least one of a second contact surface. The first contact surface includes at least one of a first electrical contact surface, a first optical contact surface, and a first partial electrical-partial optical contact surface. The second contact surface includes at least one of a second electrical contact surface, a second optical contact surface, and a second partial electrical-partial optical contact surface. At least one of the first contact surface and at least one of the second contact surface make contact with each other to establish an electrical connection, an optical connection, or both between the steering wheel and the steering axle of the automotive simulator.

Further, it should be noted that while the first adapter element has been referred to as a recess and the second adapter element has been referred to as a protrusion, the opposite may also be true, that is, that the distal end 104 of the steering wheel 100 has a protrusion and that the proximal end of the steering axle 206 has a recess.

The adapter system shown in FIGS. 1-4 provides a simple way to attach and detach the steering wheel 100 from the steering axle 206. As can be seen in FIGS. 1-4 the recess 106 and protrusion 208, respectively, of the adapter system are placed such that an essentially downward vertical motion of the steering wheel 100 is used to attach the steering wheel 100 to the steering axle 206, and a corresponding upward motion is used to detach the steering wheel 100 from the steering axle 206. As a result of the placement of the recess 106 and protrusion 208, respectively, the gravity acting on the steering wheel 100 aids in bringing the first and second electrical contact surfaces 108 and 210 against each other, which aids in creating a secure electrical connection between the steering wheel 100 and the steering axle 206. However, it should be noted that there are other embodiments in which the recess 106 and protrusion 208, respectively, can be placed such that a substantially horizontal movement (or any direction between horizontal and vertical) is used to attach/detach the steering wheel 100 from the steering axle 206. Typically, the surrounding environment of the automotive simulator will impose constraints on what particular configuration of the steering wheel adapter system is the most appropriate one, and making such a determination and the appropriate modifications of the steering wheel adapter system lies well within the skill set of those having ordinary skill in the art.

Figure 5:
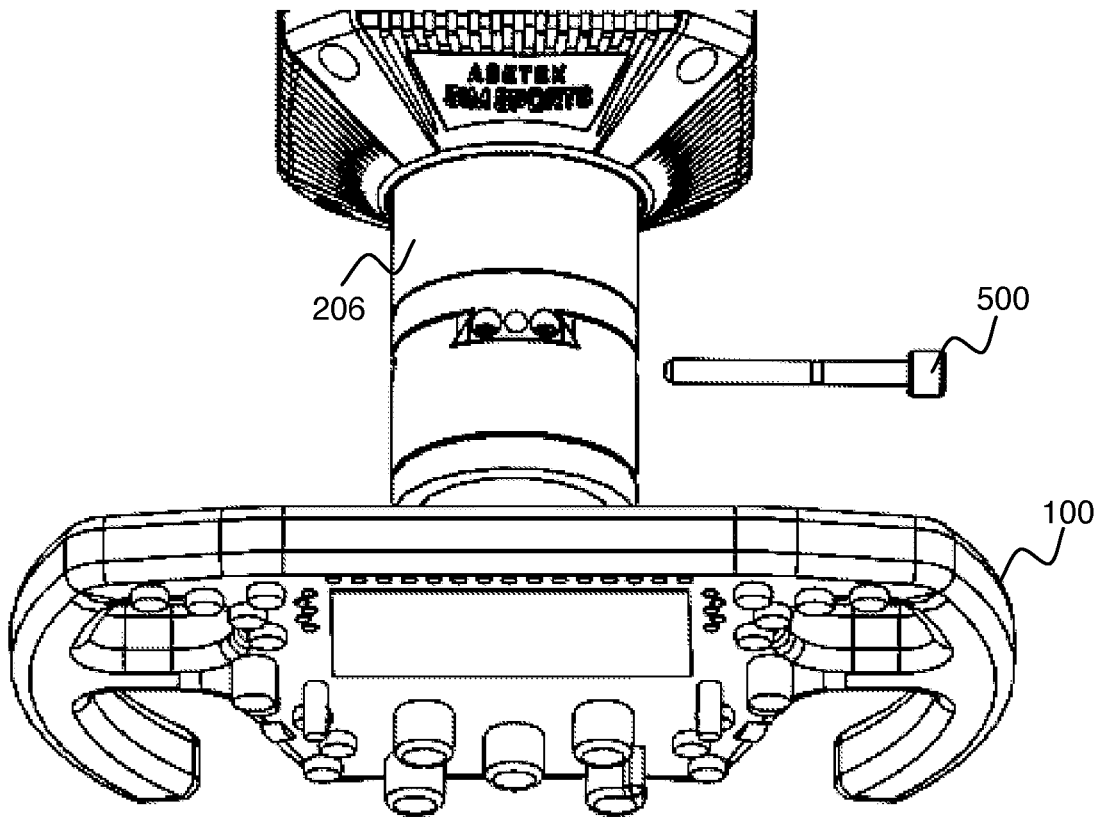
FIG. 5 illustrates a bottom perspective view of the steering wheel 100 attached to the steering axle, and a locking pin for securing the steering wheel 100 to the steering axle, in accordance with one embodiment.
Figure 6:
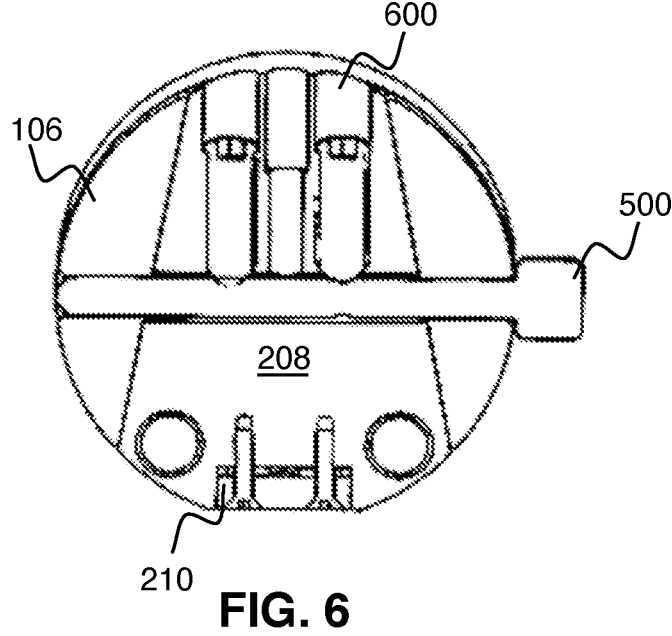
FIG. 6 illustrates a cross sectional view of the steering wheel connector, with the locking pin in its inserted position, in accordance with one embodiment.

In some embodiments, the steering wheel 100 can be further secured to the steering axle 206 using a pin 500 that can be inserted into one or more holes in the first adapter and the second adapter when said holes are aligned. An example of such an embodiment is shown in FIGS. 5 and 6. FIG. 5 shows a bottom perspective view of the steering wheel 100 being attached to the steering axle 206, prior to inserting the pin 500. In the embodiment shown in FIGS. 5 and 6, the pin 500 comprises one or more grooves. These grooves are configured to engage with one or more spring-loaded elements 600 that are located in the protrusion 208. FIG. 6 shows a cross-sectional view of the pin 500 being inserted through the first and second adapter elements, respectively, to secure them together. The spring-loaded elements 600 engage with the pin 500 to prevent the pin 500 from falling out when the user turns the steering wheel 100 during operation of the automotive simulator. The pin 500 is inserted through matching holes in the first and second adapter elements, respectively, which can also be seen in FIG. 2. In the embodiment shown in FIG. 6, the grooves in the pin 500 and the spring-loaded elements 600 are symmetrically placed, so the pin 500 can be inserted from either direction, which further facilitates the installation process of the steering wheel 100 for the user.

Figure 7:
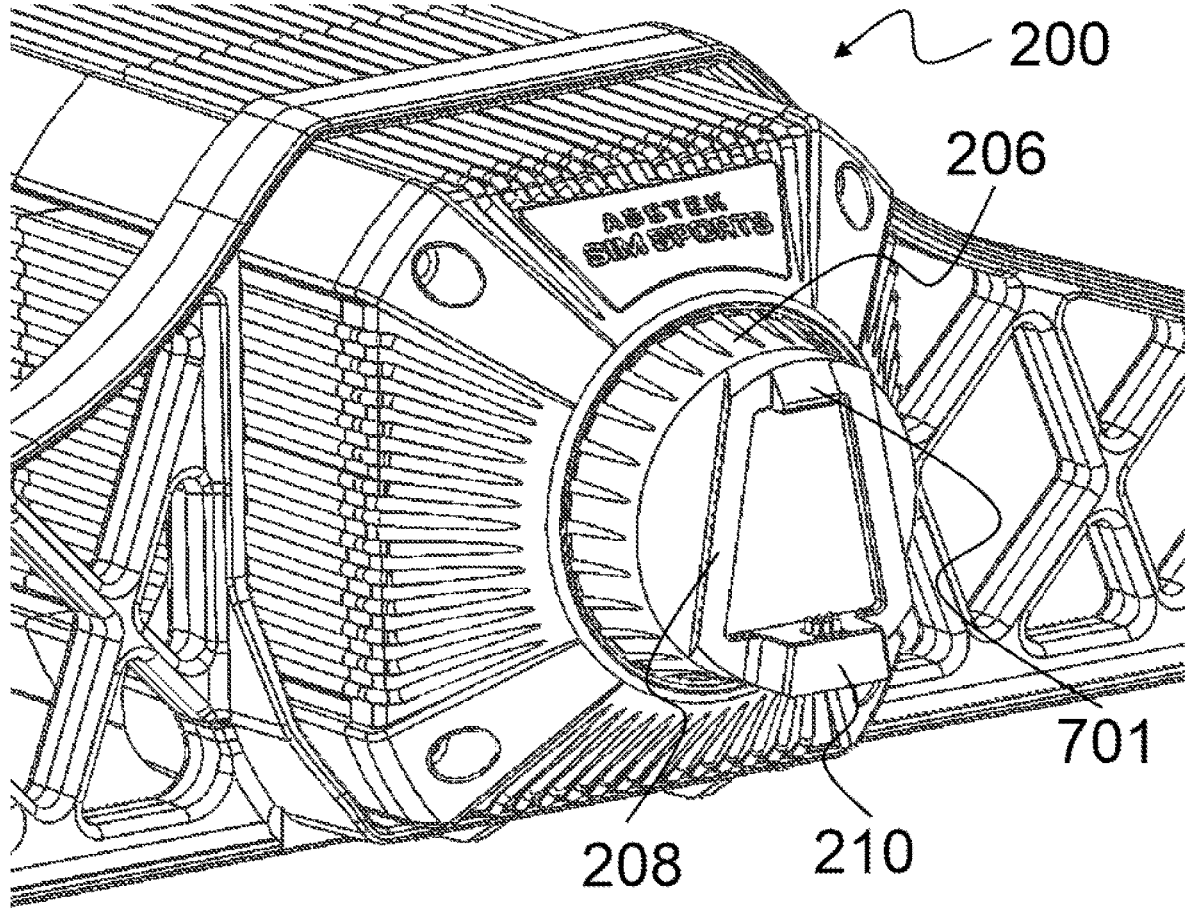
FIG. 7 illustrates a perspective view of a steering wheel base 200 for use in an automotive simulation system, in accordance with one alternative embodiment.
Figure 8:
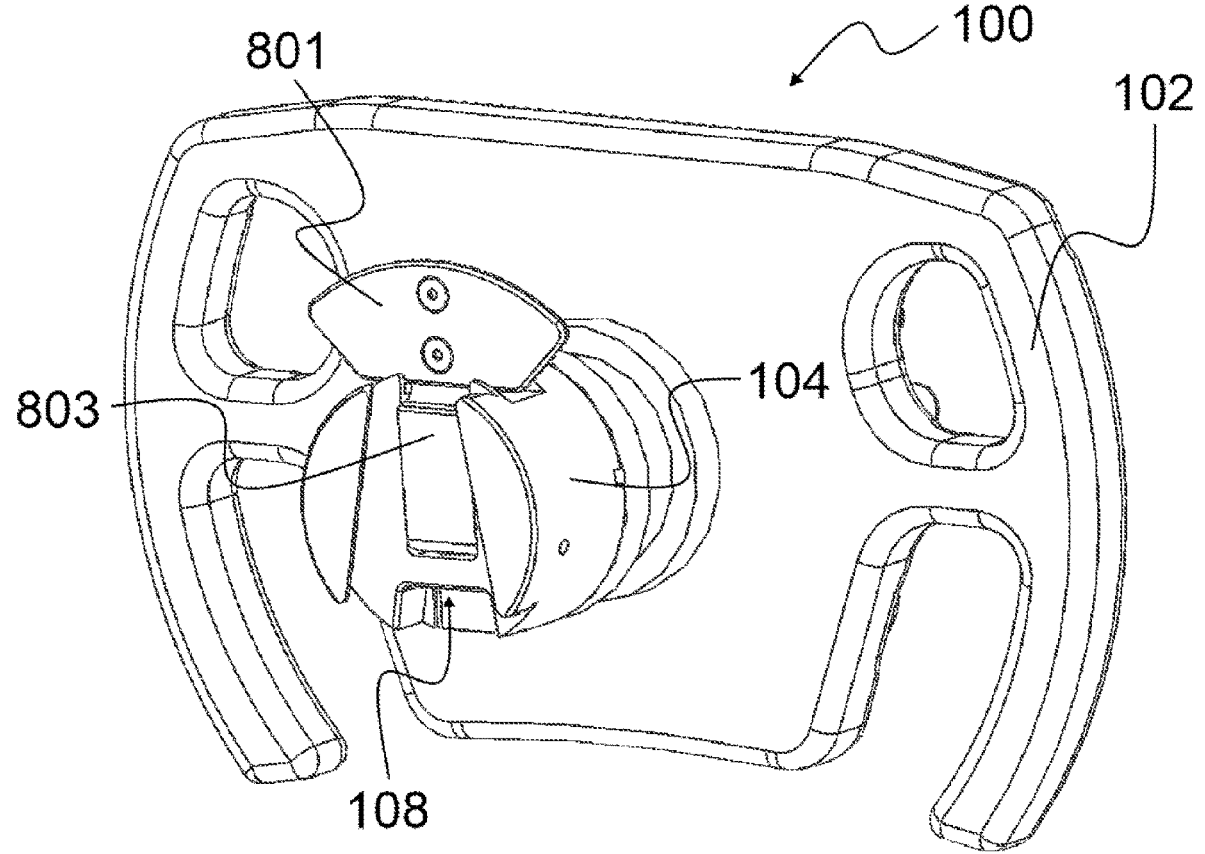
FIG. 8 illustrates a perspective view of the distal end of a steering wheel 100 for attaching to a steering axle, in accordance to one alternative embodiment comprising a beam locking mechanism.
Figure 9:
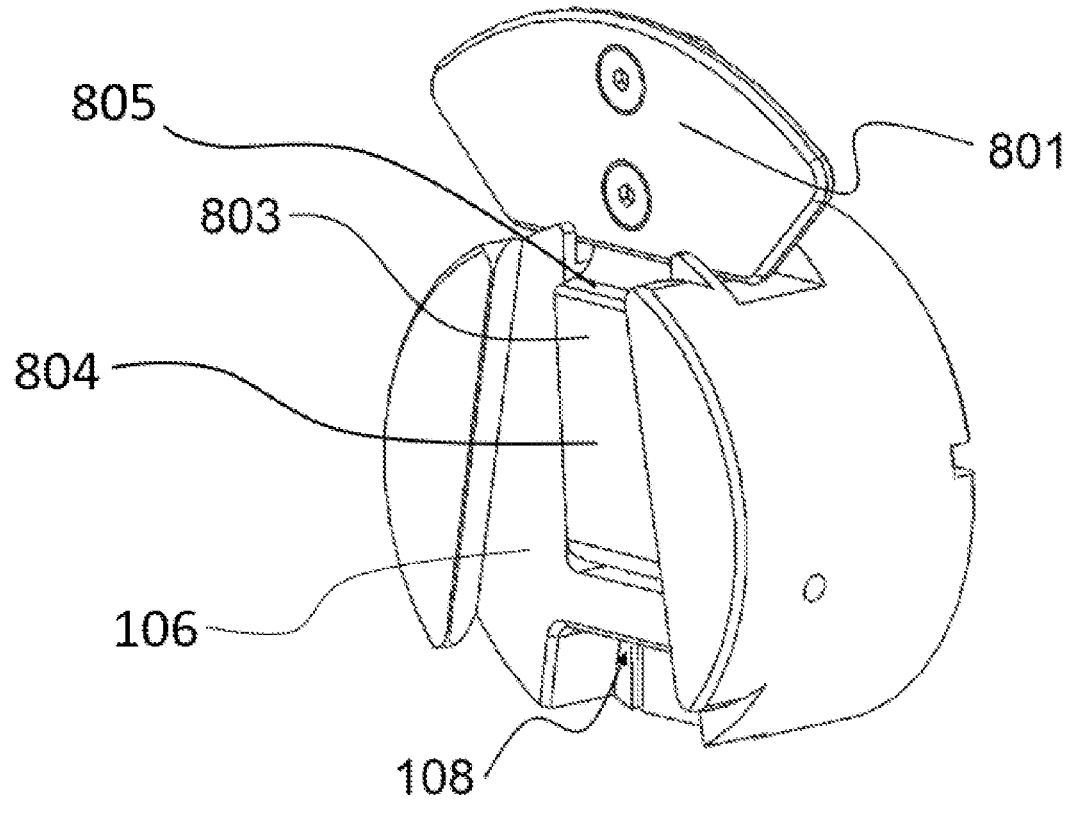
FIG. 9 illustrates a closeup view of the distal end of a steering wheel, in accordance with one alternative embodiment.

In some embodiments, the steering wheel 100 can be secured to the steering axle 206 by a snap-lock mechanism. This snap-lock mechanism could be used if an easy, fast, and reliable mounting of a steering wheel 100 was desired. An example of such an embodiment is shown in FIGS. 7, 8, 9, and 10. The steering wheel base 200 is shown in FIG. 7 and comprises the steering axle 206. The steering axle 206 further comprises a protrusion 208, a second electrical contact surface 210, and a barb 701. The steering wheel 100 is shown in FIG. 8 and comprises a steering handle 102 for holding onto the steering wheel 100, a first electrical contact surface 108, together with a beam 801 that can act as a spring placed on a distal end 104 of the steering wheel 100. The beam 801 comprises a second protrusion 803 that includes a first surface 804 and a second surface 805. A magnified view of the distal end 104 of the steering wheel 100 can be seen in FIG. 9. The beam 801 can be bent in the direction towards the proximal end of the steering wheel 100 by pushing on the part of the beam 801 that is furthest away from the center of the steering wheel 100, such that the protrusion 803 connected to the beam is lowered into a recess surface 106 of the distal end 104 of the steering wheel 100. Specifically, when the beam 801 is bent in the direction away from the first surface 804, the first surface 804 of the protrusion 803 is lowered into the recess surface 106. When the beam 801 is bent in the direction towards the first surface 804, the first surface 804 of the protrusion 803 pops up above the recess surface 106.

Figure 10:
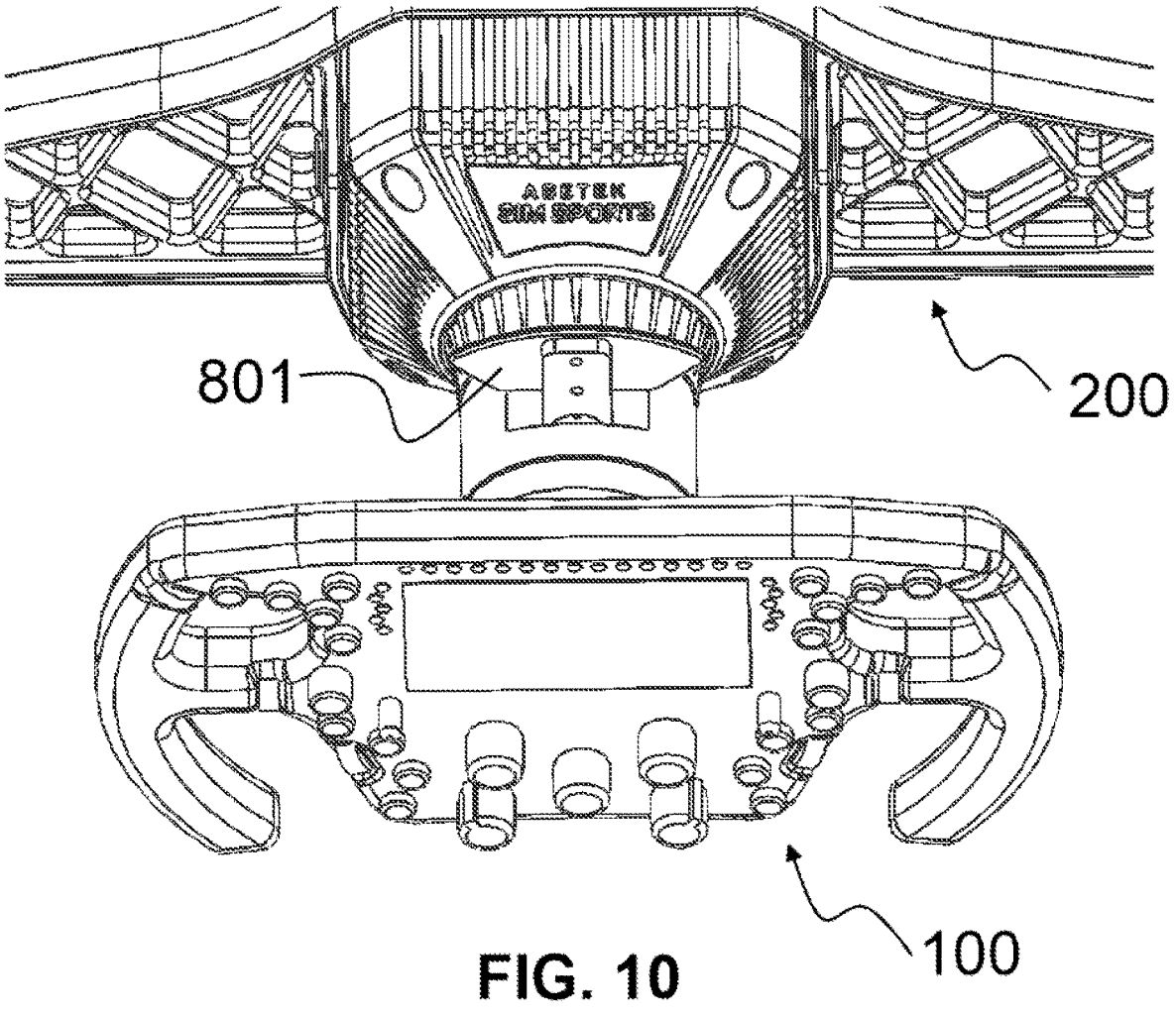
FIG. 10 illustrates one alternative embodiment of the invention where a steering wheel 100 is mounted and secured to a steering axle 206 on a steering wheel base 200.

In one embodiment, the snap-lock mechanism comprises beam 801 placed on the distal end of the steering wheel 100 and the barb 701 placed on the proximal end of the steering wheel base 200. When the steering wheel 100 slides onto the steering axle 206, the beam 801 bends as the first surface 804 is pushed by the barb 701. When the steering wheel 100 slides all the way until the steering wheel is aligned with the steering axle 206, the beam 801 returns to a neutral position and the first surface 804 no longer contacts the barb 701 and the first surface 804 pops up. The barb 701 is stopped by the second surface 805 and locks the steering wheel 100 to the steering axle 206. If the steering wheel 100 was pushed in the opposite direction the way that it was slid on to the steering axle 206, the second surface 805 would hit the barb 701 and block the sliding movement of the steering wheel. Thus, it is in a locked position such that the steering wheel 100 is aligned with the steering axle 206 as shown in FIG. 10. To remove the steering wheel 100, the beam 801 is pulled towards the proximal end of the steering wheel 100 until the second surface 805 is free of contacting the barb 701. Now the steering wheel 100 can slide off the steering axle 206. This lock mechanism could also be carried out in an embodiment where the barb 701 is placed on the distal end 104 of the steering wheel 100 and the beam 801 is placed on the proximal end of the steering axle 206 in the same manner as the position of the protrusion 208 and recess 106 can be swapped.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A steering wheel adapter system for an automotive simulator, comprising:
   a first adapter element formed in a distal end of a steering wheel;
   a second adapter element formed in a proximal end of a steering axle of the automotive simulator,
   wherein the first adapter element and the second adapter element are configured to slide against each other along a plane that is substantially perpendicular to the steering axle until a coupling position has been reached in which a central axis of the steering wheel is aligned with a central axis of the steering axle,
   the steering wheel adapter system further comprising a snap-lock mechanism comprising:

a beam on one of the adapter elements and a barb on the other adapter element;

the beam including a first protrusion with a first surface and a second surface, wherein the first protrusion is configured to be lowered into a first recess when the beam is bent in a direction away from the first surface, wherein the barb is configured to:

push the first surface of the first protrusion until the coupling position has been reached during installation; and contact the second surface if the steering wheel is pushed in an opposite direction that it was slid on to the steering axle to prevent sliding of the first adapter element and the second adapter element against each other after the coupling position has been reached and the first surface pops up.

2. The steering wheel adapter system of claim 1, wherein the first adapter element comprises a second recess and the second adapter element comprises a second protrusion.

3. The steering wheel adapter system of claim 1, wherein the first adapter element comprises a second protrusion and the second adapter element comprises a second recess.

4. The steering wheel adapter system of claim 3, wherein the first adapter element and the second adapter element are configured to be pushed together and retained in the coupling position under force of gravity.

5. The steering wheel adapter system of claim 4, wherein each of the first adapter element and the second adapter element includes one or more holes for receiving one or more locking pins therethrough when the holes in the first adapter element and the second adapter element are aligned, wherein each one of the one or more locking pins includes one or more grooves which are engaged with one or more spring-loaded elements.

6. The steering wheel adapter system of claim 1, wherein the beam is configured on the second adapter element and the barb is configured on the first adapter element.

7. The steering wheel adapter system of claim 1 wherein the beam is configured on the first adapter element and the barb is configured on the second adapter element.

8. A steering wheel for an automotive simulator, comprising:

a distal end having a first adapter element that is configured to slide against a second adapter element formed in a proximal end of a steering axle of the automotive simulator, said first adapter element is further configured to slide along a plane that is substantially perpendicular to the steering axle until a coupling position with the second adapter element has been reached in which a central axis of the steering wheel is aligned with a central axis of the steering axle, the steering wheel further comprising a beam on the first adapter element that comprises a first protrusion with a first surface and a second surface, wherein the first protrusion is configured to be lowered into a first recess surface when the beam is bent in a direction away from the first surface;

wherein the second surface contacts a barb on the steering axle if the steering wheel is pushed in an opposite direction that it was slid on to the steering axle to prevent sliding of the first adapter element and the second adapter element against each other after the coupling position has been reached and the first surface pops up.

9. The steering wheel of claim 8, wherein the first adapter element comprises a second recess.

10. The steering wheel of claim 8, wherein the first adapter element comprises a second protrusion.

11. The steering wheel of claim 10, wherein the first adapter element is configured such that when it reaches the coupling position with the second adapter element, it is retained in the coupling position under force of gravity.

12. A steering axle for an automotive simulator, comprising:

a proximal end having a second adapter element configured to slide against a first adapter element formed in a distal end of a steering wheel, wherein the second adapter element is further configured to slide along a plane that is substantially perpendicular to the steering axle until a coupling position with the first adapter element of the steering wheel has been reached in which a central axis of the steering wheel is aligned with a central axis of the steering axle, the steering axle further comprising:

a barb on the second adapter element configured to:

push a first surface of a first protrusion until the coupling position has been reached during installation; and contact a second surface if the steering wheel is pushed in an opposite direction that it was slid on to the steering axle to prevent sliding of the first adapter element and the second adapter element against each other after the coupling position has been reached and the first surface pops up.

13. The steering axle of claim 12, wherein the second adapter element comprises a second recess.

14. The steering axle of claim 12, wherein the second adapter element comprises a second protrusion.

15. The steering axle of claim 14, wherein the second adapter element is configured such that when it reaches the coupling position with the first adapter element, it is retained in the coupling position under force of gravity.

* * * * *